United States Patent
Kang et al.

(10) Patent No.: US 9,947,235 B2
(45) Date of Patent: Apr. 17, 2018

(54) SMART LEARNING SYSTEM USING DEVICE SOCIAL RELATION AND METHOD THEREOF

(71) Applicant: Electronics and Telecommunications Research Institute, Daejeon (KR)

(72) Inventors: Dong Oh Kang, Daejeon (KR); Kyu Chang Kang, Daejeon (KR); Joon Young Jung, Daejeon (KR); Jang Ho Choi, Seoul (KR); Jin Young Moon, Daejeon (KR); Chang Seok Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 466 days.

(21) Appl. No.: 14/638,238

(22) Filed: Mar. 4, 2015

(65) Prior Publication Data
US 2015/0254993 A1 Sep. 10, 2015

(30) Foreign Application Priority Data
Mar. 4, 2014 (KR) .................. 10-2014-0025497

(51) Int. Cl.
G09B 7/00 (2006.01)
G09B 5/12 (2006.01)

(52) U.S. Cl.
CPC ............... G09B 5/125 (2013.01); G09B 7/00 (2013.01)

(58) Field of Classification Search
USPC ....................................................... 434/362
See application file for complete search history.

(56) References Cited

U.S. PATENT DOCUMENTS

2003/0207244 A1 11/2003 Sakai et al.
2013/0189664 A1 7/2013 Lee et al.

FOREIGN PATENT DOCUMENTS

JP 2012-008426 A 1/2012
KR 10-2012-0004719 A 1/2012

*Primary Examiner* — Kesha Frisby
(74) *Attorney, Agent, or Firm* — Rabin & Berdo, P.C.

(57) ABSTRACT

Disclosed are a smart learning system using a device social relation and a method thereof. The smart learning system includes a first device that generates a device social relation and shares learning content, and at least one second device that executes an event related to the learning content by acquiring the shared learning content when is included in the device social relation.

18 Claims, 11 Drawing Sheets

SMART LEARNING SYSTEM USING DEVICE SOCIAL RELATION AND METHOD THEREOF

CROSS-REFERENCE TO RELATED APPLICATION

This application claims priority to and the benefit of Korean Patent Application No. 10-2014-0025497, filed on Mar. 4, 2014, the disclosure of which is incorporated herein by reference in its entirety.

BACKGROUND

1. Field of the Invention

The present invention relates to a smart learning system, and more particularly, to a smart learning system using a device social relation and a method thereof.

2. Discussion of Related Art

In recent years, according to the development of digital technologies, electronic terminals capable of processing communication and personal information while moving such as mobile communication terminals, personal digital assistants (PDAs), electronic organizers, smartphones, tablet personal computers (PCs), and the like have been variously released.

Through rapid technological developments, the electronic terminals may have various functions such as video call function, electronic organizer function, document function, e-mail function, Internet function, social network service (SNS) function, and the like in addition to initial simple voice call and short message service (SMS) transmission function.

In particular, various functions of such electronic terminals have been used in learning by many people, and a smart learning method using a smart device in learning has been recognized as a significantly convenient learning method due to its temporal and spatial efficiency.

Specifically, smart learning and classes that utilize the electronic terminals in learning may provide utilization of various digital contents and a sharing function via a network, and therefore effective learning may be achieved compared to traditional learning using learning tools such as black boards, notes, and the like.

However, terminals of conventional smart learning or classes are connected to each other while each terminal performs a fixed role. Because of this, when mutual linkage among devices is required, familiarity with the usage of terminals that link with each other should be required.

As the types of the terminals become more diversified and functions of the terminals are gradually increased, familiarity with the usage of the terminals that link with each other may impose a lot of burdens to users.

In addition, in a case in which electronic constitution participating in learning is variable due to its portability or a case in which learning in various spaces rather than learning in a fixed space is needed, an existing learning terminal linkage method is subjected to a complex setting process or connection process at the time of connection or interaction among devices, and therefore a natural learning process of the traditional learning method level is difficult to be achieved, resulting in deterioration in learning efficiency.

SUMMARY OF THE INVENTION

The present invention is directed to a more convenient linkage method for smart devices and a smart learning system which may use a device social relation in smart learning or classes.

According to an aspect of the present invention, there is provided a smart learning system including: a first device that generates a device social relation and shares learning content; and at least one second device that executes an event related to the learning content by acquiring the shared learning content when is included in the device social relation. Here, the smart learning system may include a remote management server that shares and sets information transmitted from the first device so that the second device of at least one other user associated with a user of the first device receives the information transmitted from the first device, and transmits the shared and set information of the first device to the second device.

Also, the first device may be included in the device social relation by sensing information including network signals of the first device, or by a user's input via a user interface.

Also, when is recognized by the first device, the second device may be displayed in a user interface of the first device, and included in the device social relation by the user's input of the first device.

Also, when is included in the device social relation, the first device may generate a lower group social relation associated with the device social relation.

Also, the first device and each of the at least one second device may include a user interface processing module that receives social relation generation data including a name of the device social relation, social relation member information, and a social relation member structure from the user, a device sociality linkage module that generates, stores, updates, corrects, and deletes the social relation based on the social relation generation data, a device recognition module that recognizes the device using information sensed by a network or the first device and the second device, and a device function connection module that connects the recognized device and the device included in a predetermined social relation to communicate with each other.

Also, the device sociality linkage module may generate a data structure of sociality data including the name of the device social relation, social relation member information, a communication ID of the social relation member device, information about resources shared in the social relation, a member structure, and information about roles performed by the first and second devices.

Also, the sociality data and the data structure of the sociality data may be stored in a storage module inside the device or in the remote management server.

Also, the first device included in the device social relation may be set based on the data structure of the sociality data.

Also, the device recognition module may recognize the device based on positional information of the device and distance information between the devices.

Also, the first device may further include a learning content management module that manages learning content stored in a storage space of a local device or a remote server, designates leaning content required in the device social relation, and shares the designated learning content with the second device.

Also, the first device and each of the at least one second device may further include a server interface module that manages the first device, metadata of the first device, and device sociality data, and communicates with the remote management server.

Also, the first device and each of the at least one second device may further include a device function management module that manages corrected or updated device sociality data.

According to another aspect of the present invention, there is provided a smart learning method including: generating a device social relation; setting a member device included in the device social relation; and transmitting learning content to the member device included in the device social relation.

Here, the setting of the member device may include setting the member device included in the device social relation based on sensing information including network signals of the device, and setting the member device through a user's input.

Also, the setting of the member device may include recognizing a device, displaying the recognized device in a user interface, and setting the device input by a user among the displayed devices as the member device.

Also, the recognizing of the device may include recognizing the device using at least one of signal strength of a network of the device, broadcasting in a segment of the network, and multitasking in the segment of the network, or recognizing the device based on positional information of the device acquired from a sensor of the device and distance information between the devices.

Also, the generating of the device social relation may include generating a data structure of sociality data including a name of the device social relation, social relation member information, a communication ID of the social relation member device, information about resources shared in the social relation, a member structure, and information about a role performed by the device, and storing the generated data structure of sociality data and the sociality data.

Also, the member device included in the device social relation may be set based on the data structure of sociality data.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Example embodiments of the present invention are disclosed herein. Also, specific structural and functional details disclosed herein are merely representative for purposes of describing the example embodiments of the present invention. However the example embodiments of the present invention may be embodied in many alternative forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Figure 1:
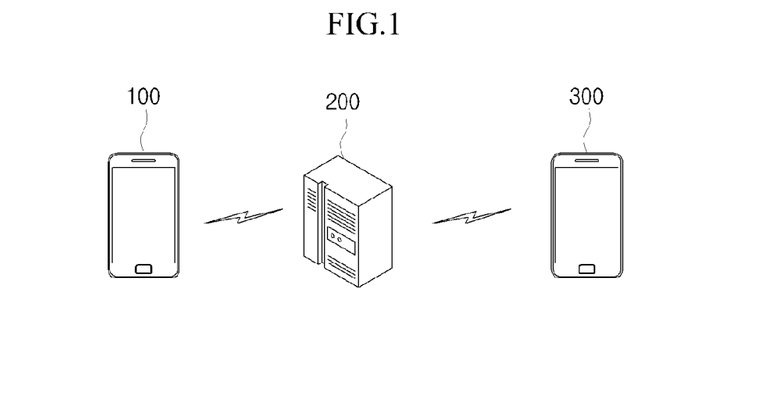
FIG. 1 is a schematic diagram illustrating a configuration of a smart learning system using a device social relation according to an embodiment of the present invention.

FIG. 1 is a schematic diagram illustrating a configuration of a smart learning system using a device social relation according to an embodiment of the present invention.

Referring to FIG. 1, the smart learning system according to an embodiment of the present invention includes a first device 100 and a second device 300. In addition, a smart learning system according to another embodiment of the present invention may include a first device 100, a second device 300, and a remote management server 200.

The second device 300 may be collectively referred to as an "external device", and in FIG. 1, the second device 300 may be shown as one component, but a plurality of second devices 300 may be provided. In addition, the first device 100 and the second device 300 may be collectively referred to as a "learning terminal".

Here, the first device 100 and the second device 300 include fixed terminals such as a PC, and portable mobile terminals such as notebooks, smart pads, smart phones, and the like. For example, the first device 100 and the second device 300 may include information communication devices and multimedia devices such as a mobile communication terminal, a digital broadcasting terminal, a mega audio layer-3 (MP3) player, a portable multimedia player (PMP), a digital camera, a navigation terminal, a personal digital assistant (PDA), a smart phone, an international mobile telecommunication 2000 (IMT-2000) terminal, a wideband code division multiple access (WCDMA) terminal, a universal mobile telecommunication service (UTMS) terminal, and the like.

The first device 100 generates a device social relation and shares learning content.

The remote management server 200 shares and sets information transmitted from the first device 100 so that the second device 300 of at least one other user associated with a user of the first device 100 receives the information transmitted from the first device 100, and transmits the shared and set information of the first device 100 to the second device 300.

The second device 300 executes an event related to the learning content by acquiring the shared learning content from the first device 100 when is included in the device social relation.

Figure 2:
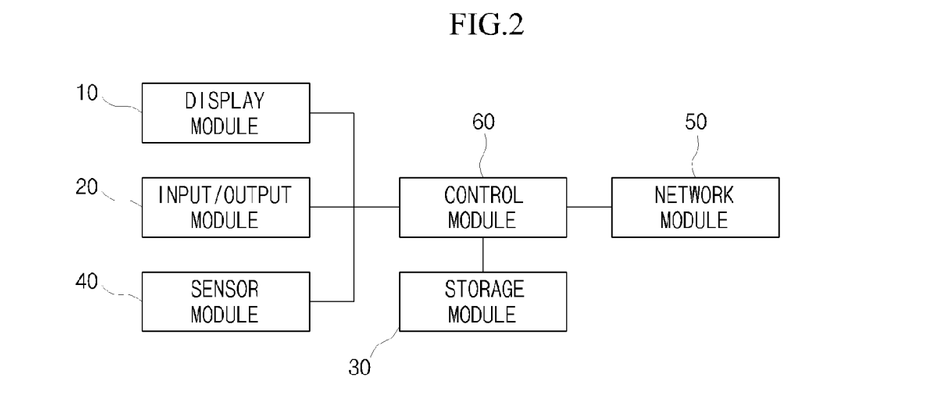
FIG. 2 is a hardware configuration diagram illustrating a leaning terminal according to an embodiment of the present invention.

FIG. 2 is a hardware configuration diagram illustrating a leaning terminal according to an embodiment of the present invention.

As illustrated in FIG. 2, the first device 100 and the second device 300 which are learning terminals include a display module 10, an input/output module 20, a storage module 30, a sensor module 40, a network module 50, and a control module 60.

The term "module" used in the present specification should be interpreted to include software, hardware, and a combination thereof according to the context in which the term is used. For example, the software may be machine language, firmware, embedded code, and application software. As another example, the hardware may be a circuit, a processor, a computer, an integrated circuit, an integrated circuit core, a sensor, micro-electro-mechanical system (MEMS), a passive device, or a combination thereof.

The display module 10 displays graphic information required for mutual linkage among devices. The display module 10 includes a monitor, a liquid crystal display, a beam projector, and the like, and includes a separate device connected to a terminal to be included in the terminal.

The input/output module 20 receives data required for generating the device social relation from a user. The input/output module 20 includes a variety of devices such as a keyboard, a mouse, a touch screen, a touch pad, a speaker, a microphone, a joystick, and the like, and includes a virtual keyboard, a virtual mouse, and the like which are configured by software. In addition, the input/output module 20 includes a separate device connected to a terminal to be included in the terminal.

The storage module 30 stores data or learning content required for generating the device social relation, a data structure of the device social relation, and the like. The storage module 30 may be provided inside the learning terminals 100 and 300. The storage module 30 includes an external storage device outside the storage module 30, a virtual storage device through cloud, and the like. The storage module 30 may be constituted of at least one integrated circuit, a disk-based storage device, or a random access memory (RAM) device capable of reading and writing.

The sensor module 40 may sense positional information of the learning terminals 100 and 300, whether the learning terminals 100 and 300 are moved, distance information between devices, and the like through an obstacle detecting sensor, a movement detecting sensor, a communication signal detecting sensor, and the like.

The network module 50 recognizes communication signals of the learning terminals 100 and 300 included in the device social relation to perform communication. The network module 50 may be provided in the form of P2P such as Bluetooth, and includes a network module capable of being connected to the Internet such as an IP network.

A plurality of display modules 10, input/output modules 20, storage modules 30, sensor modules 40, and network modules 50 of the learning terminals 100 and 300 may be provided in the terminal.

The above-described functions of the learning terminals 100 and 300 may be different for each terminal, and therefore constituent components such as the display module 10, the input/output module 20, the storage module 30, the sensor module 40, the network module 50, and the like of each terminal may be different.

The control module 60 may control overall operations of the storage module 30 and the network module 50 from the display module 10, the input/output module 20, and the sensor module 40.

Figure 3:
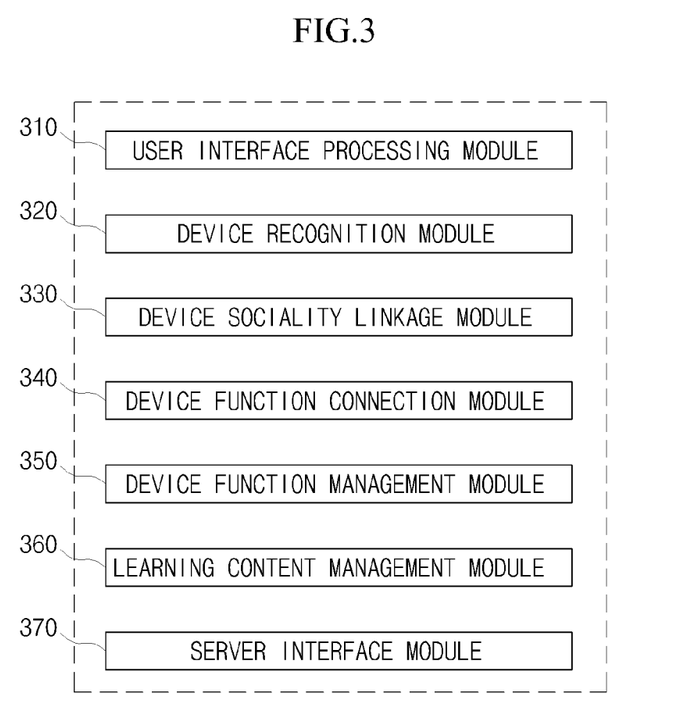
FIG. 3 is a software configuration diagram illustrating a learning terminal according to an embodiment of the present invention.

FIG. 3 is a software configuration diagram illustrating a learning terminal according to an embodiment of the present invention.

Learning terminal software operated in the learning terminals 100 and 300 according to an embodiment of the present invention may designate a role of the corresponding device in smart learning, and generate a device social relation.

In addition, the learning terminal software may enable mutual linkage among devices to be achieved in accordance with the generated social relation. Specifically, the learning terminal software manages a network function of the learning terminals 100 and 300, and functions of the display module 10, the input/output module 20, the storage module 30, and the sensor module 40.

The learning terminal software operated in the learning terminals 100 and 300 may connect a device included in the device social relation to learning content or manage the learning content.

As illustrated in FIG. 3, the learning terminal software operated in the learning terminals 100 and 300 for performing the above-described functions includes a user interface processing module 310, a device recognition module 320, a device sociality linkage module 330, a device function connection module 340, a device function management module 350, a learning content management module 360, and a server interface module 370.

Hereinafter, the function of each module and mutual linkage among devices will be described in detail with reference to the drawings.

The user interface processing module 310 receives a user's input when actual learning is processed, and starts and terminates mutual linkage among devices.

Specifically, when an environment for receiving an input of the device to be included in the device social relation from a user is set, the user interface processing module 310 controls mutual linkage among devices by processing information received through the user interface.

The device recognition module 320 recognizes a device participating in learning.

For example, the device recognition module 320 may recognize a peripheral device in a method of detecting a counterpart device based on the received signal strength indication (RSSI) intensity of a Bluetooth or Wi-Fi wireless network, the intensity of sound waves, the intensity of infrared rays, and the like, a method of detecting the corresponding device through broadcasting or multitasking in a network segment, or the like. Obviously, the device recognition module 320 may recognize the peripheral device by utilizing multiple technologies other than the above-described technologies and the combination thereof.

Hereinafter, examples of mutual linkage among devices will be described in detail.

1. Mutual Linkage Among Devices Through User Interface Processing Module 310 and Device Recognition Module 320

Figure 7:
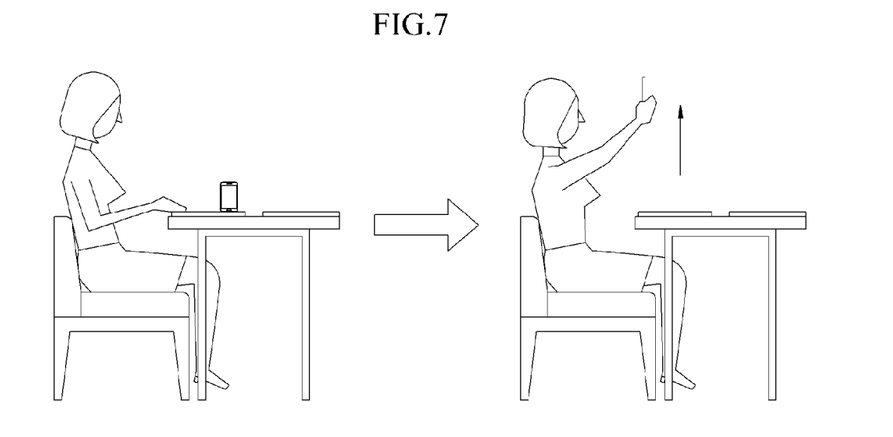
FIG. 7 is a diagram illustrating an example of a graphic user interface for device social relation member designation according to an embodiment of the present invention.

FIG. 7 is a diagram illustrating an example of a graphic user interface for device social relation member designation according to an embodiment of the present invention.

As illustrated in FIG. 7, the user interface processing module 310 may receive a user's input from a graphic user interface so that other devices may be newly included in the device social relation.

In the example illustrated in FIG. 7, when the device recognized by the device recognition module 320 is displayed through the graphic user interface, a user may group the displayed devices using a mouse or a touch pad or a screen. Thus, the new device may be included in the device social relation member.

2. Mutual Linkage Among Devices Through Device Recognition Module 320 and Sensor Module 40

Figure 8:
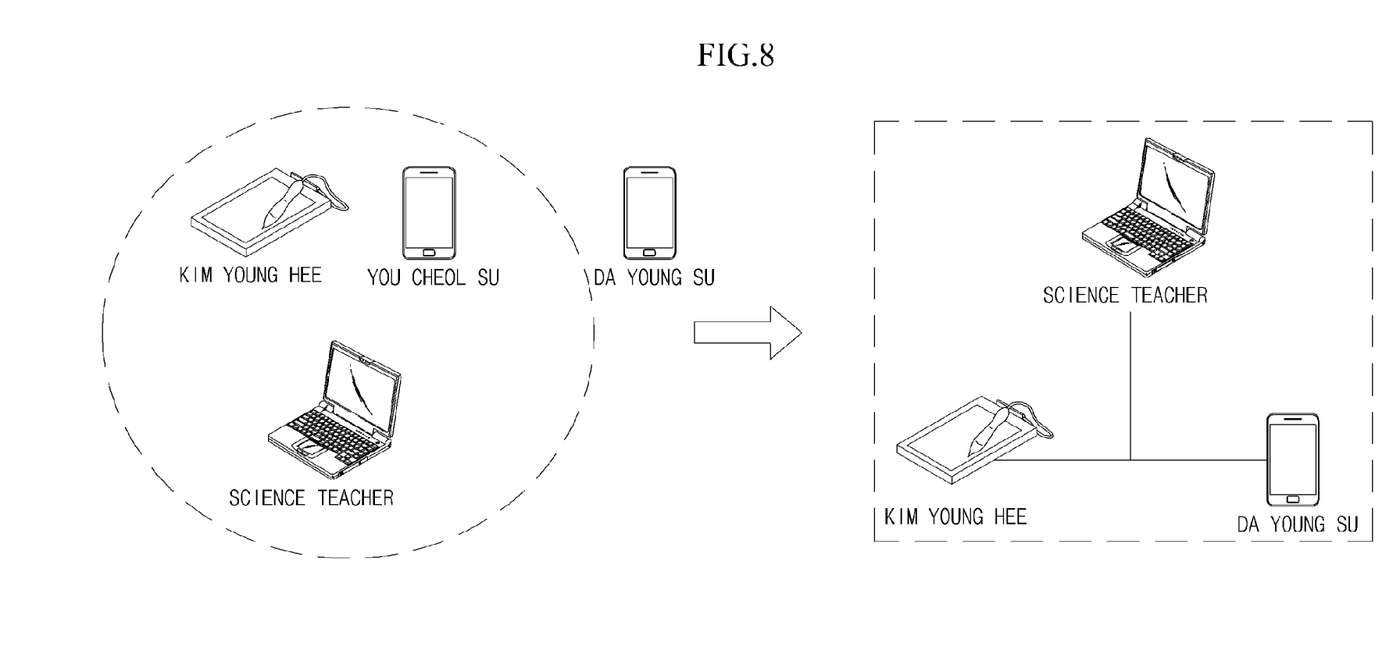
FIG. 8 is a diagram illustrating an example of device social relation member participation through a gesture according to an embodiment of the present invention.
Figure 9:
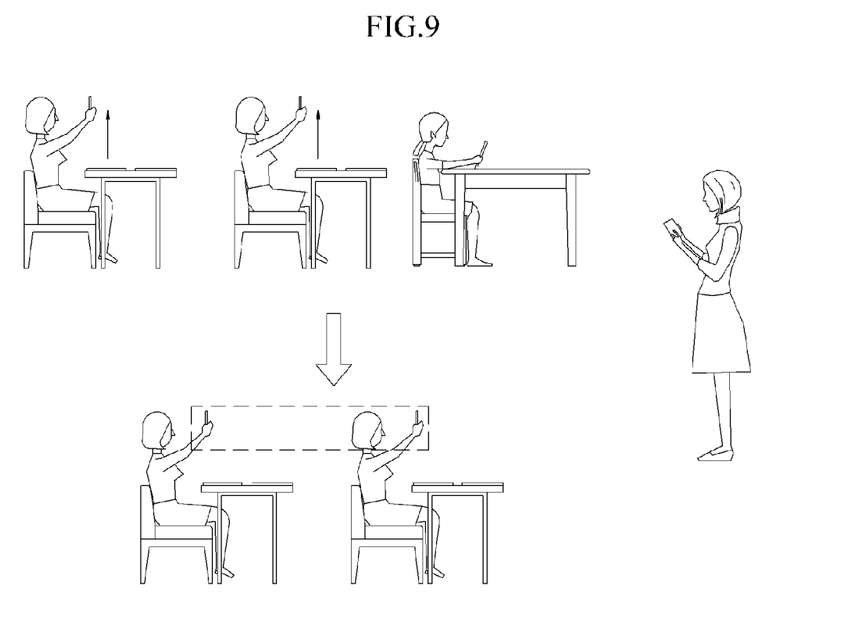
FIG. 9 is a diagram illustrating an example of device social relation member designation through a gesture according to an embodiment of the present invention.

FIG. 8 is a diagram illustrating an example of device social relation member participation through a gesture according to an embodiment of the present invention, and FIG. 9 is a diagram illustrating an example of device social relation member designation through a gesture according to an embodiment of the present invention.

As illustrated in FIG. 8, the device recognition module 320 may enable the device to be newly included in the social relation through linkage with the sensor module 40.

For example, a student who raises his or her hand to lift the device high may be recognized through the sensor module 40, and as illustrated in FIG. 9, the movement of a teacher device 100 may be recognized to enable the new device to be included in the social relation.

Figure 10:
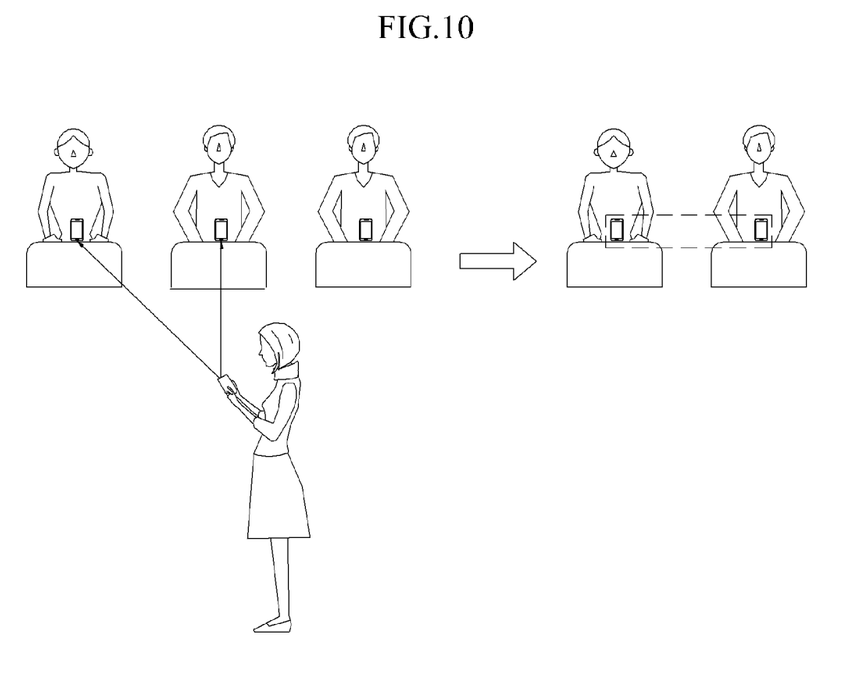
FIG. 10 is a diagram illustrating an example of device social relation member designation through near field communication (NFC) according to an embodiment of the present invention.

FIG. 10 is a diagram illustrating an example of device social relation member designation through near field communication (NFC) according to an embodiment of the present invention.

As another example, a device in which a short-range wireless communication sensor (for example, NFC) is mounted may enable a new device to be included in the social relation through sensor contact (for example, NFC sensor contact) as illustrated in FIG. 10.

The device sociality linkage module 330 may perform functions of generating, storing, updating, correcting, and deleting the device social relation. In this instance, the device sociality linkage module 330 may utilize a device sociality data structure that defines a device mutual relation.

Figure 4A:
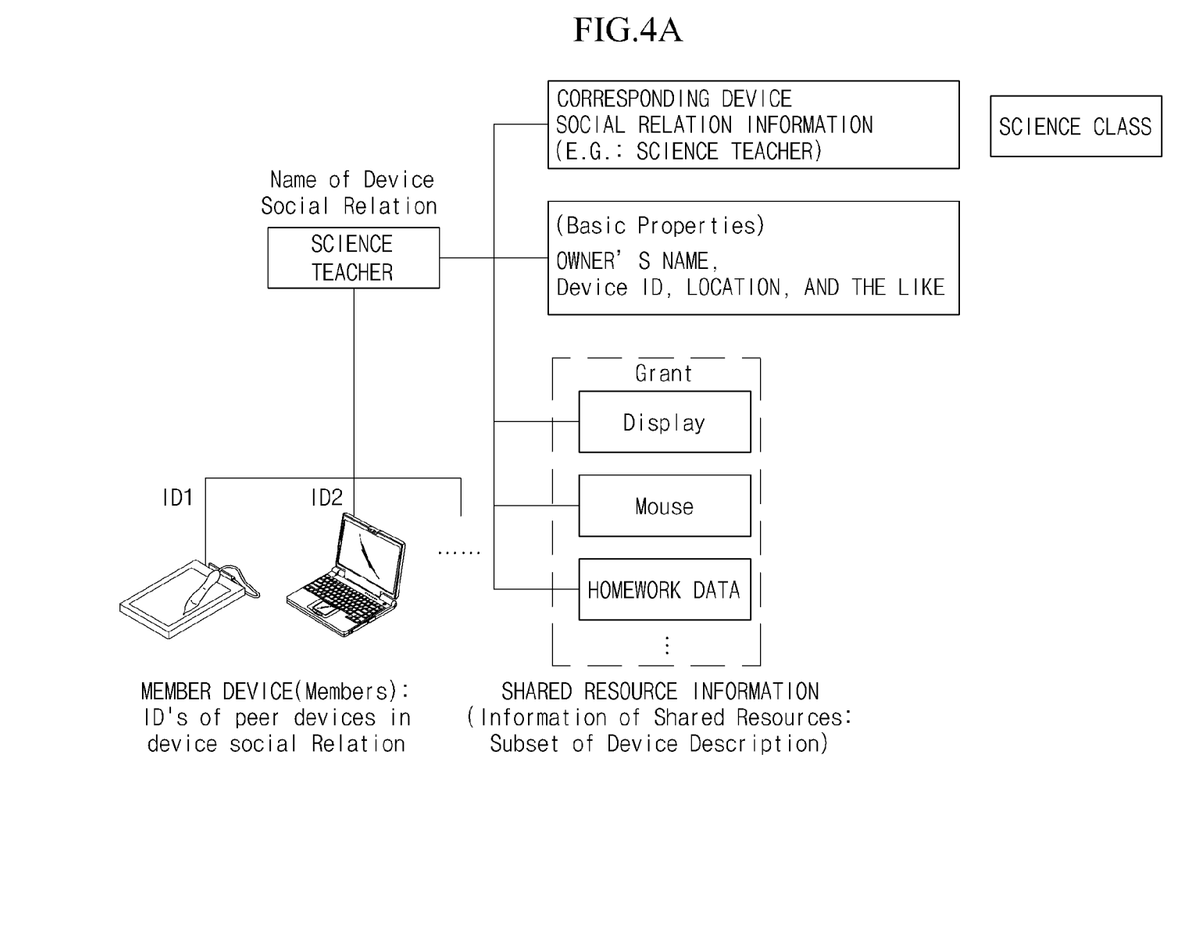
FIGS. 4A and 4B are diagrams illustrating an example of a device sociality data structure according to an embodiment of the present invention.
Figure 4B:
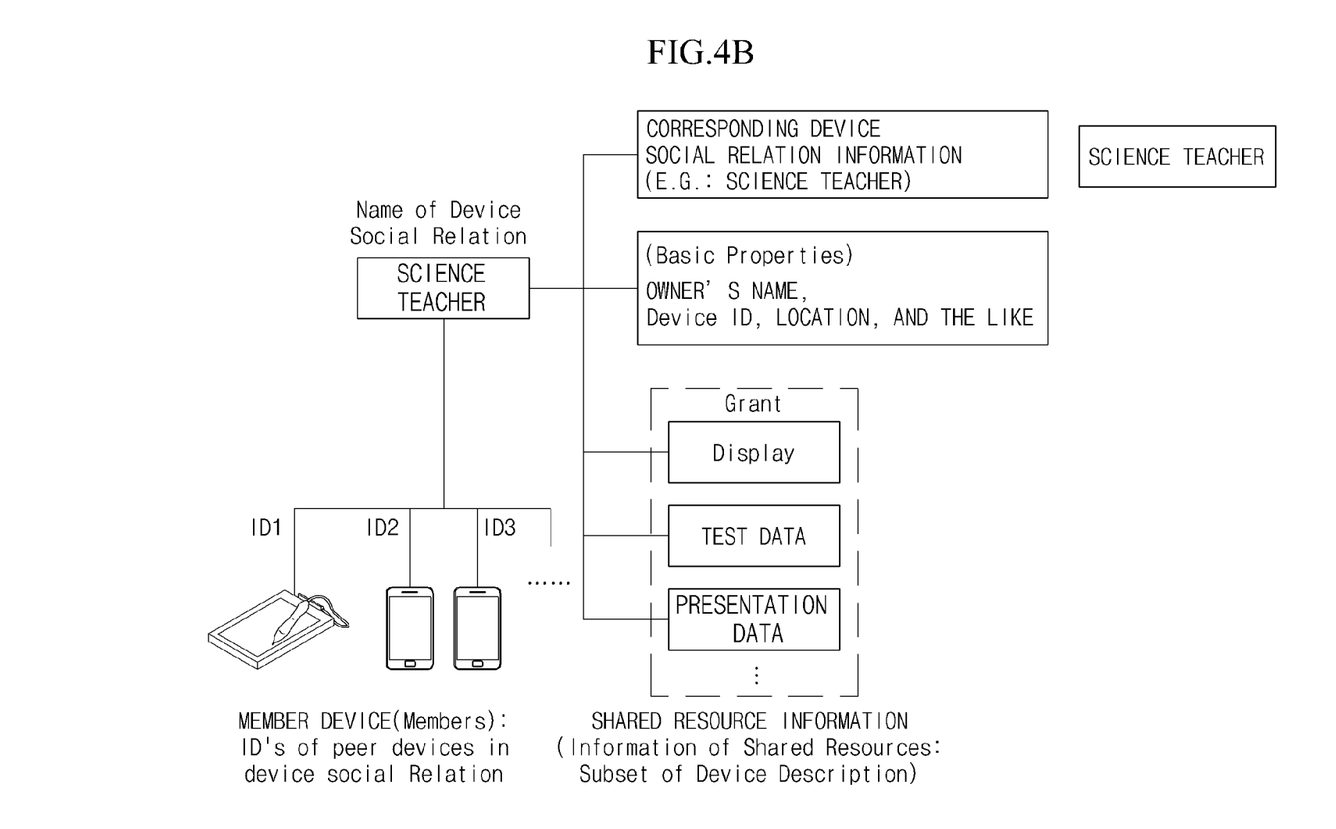

As illustrated in FIGS. 4a and 4b, the device sociality data structure may be obtained by conceptually structurizing relationship of sociality data including a name of the device social relation, social relation member information, a communication ID of the social relation member device, information about resources shared in the social relation, a member structure, and information about roles performed by the first and second devices 100 and 300.

The device sociality data structure may be stored in the storage module 30 through a database of the learning terminals 100 and 300, or stored in the remote management server 200 through a device management server interface module 370.

The device sociality linkage module 330 performs a mutual linkage function among devices that is defined in the device social relation by interacting with the user interface processing module 310.

In this instance, the device sociality linkage module 330 may be operated together with the device function connection module 340 and the device function management module 350 in order to achieve mutual linkage among devices.

In addition, the device sociality linkage module 330 may generate, store, update, correct, and delete the device social relation in conjunction with the user interface processing module 310.

3. Mutual Linkage Among Devices Through Setting of Sociality Data Structure

Hereinafter, an example of interaction of a device social relation for smart learning according to an embodiment of the present invention will be described with reference to FIGS. 4a, 4b, and 5.

As an example of the device social relation, "science class" generated by a teacher device (first device) may be given.

The social relation "science class" has a device sociality data structure, and shares resources with a student device that is a member device through shared resource information. As illustrated in FIGS. 4a and 4b, the shared resource information of the social relation "science class" may include, for example, test data, presentation data, and the like.

As an example, when one device (second device) has a specific device (first device) social relation, the counterpart device (second device) may have another device social relation corresponding to this.

Figure 5:
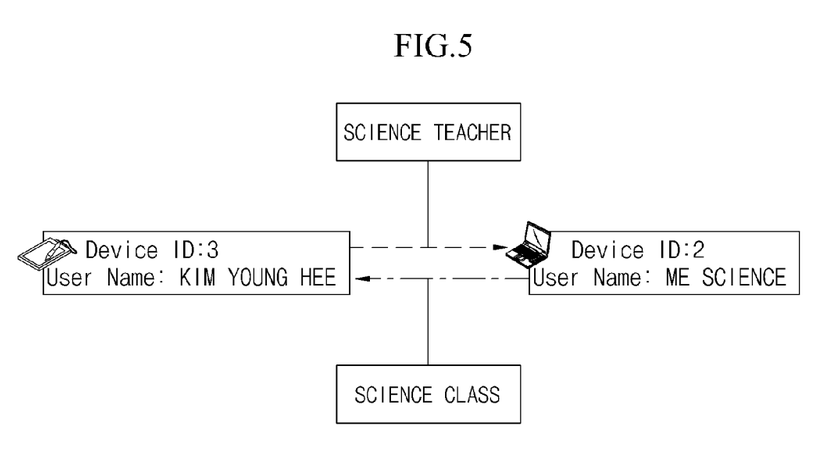
FIG. 5 is a diagram illustrating an example of interaction of a device social relation for smart learning according to an embodiment of the present invention.

FIG. 5 is a diagram illustrating an example of interaction of a device social relation for smart learning according to an embodiment of the present invention.

Referring to FIG. 5, with respect to a social relation "science class" defined in a teacher device, a student device may define a social relation "science teacher". In addition, the student device may receive information about such corresponding device social relation in the device sociality data structure.

The device function connection module 340 may be responsible for connecting functions between devices whose device social relations are defined.

For example, the device function connection module 340 is responsible for connection for enabling presentation data to be shared through mutual linkage between the teacher device and the student device or a screen to be shared.

The device function management module 350 manages local resources and functions of the corresponding device to provide information to the device function connection module 340.

In addition, the device function management module 350 may be used when the device social relation is corrected or updated in the device sociality linkage module 330.

The learning content management module 360 manages learning content stored in a local device or cloud storage to provide information.

This may be a function for which the teacher device that is the first device 100 is responsible, and when a social relation "learning" is constituted in the device social relation, the learning content management module 360 may designate learning content required for the social relation "learning" by associating the learning content required for the social relation "learning" with the social relation "learning".

When an actual social relation "learning" is constituted, sharing between devices included in the social relation is achieved based on information of the learning content management module 360.

The server interface module 370 may be an interface module with the remote management server 200, and may be additionally included in the learning terminals 100 and 300.

Here, the remote management server 200 manages metadata information of the device required for the device social relation, and stores device sociality information.

Figure 6:
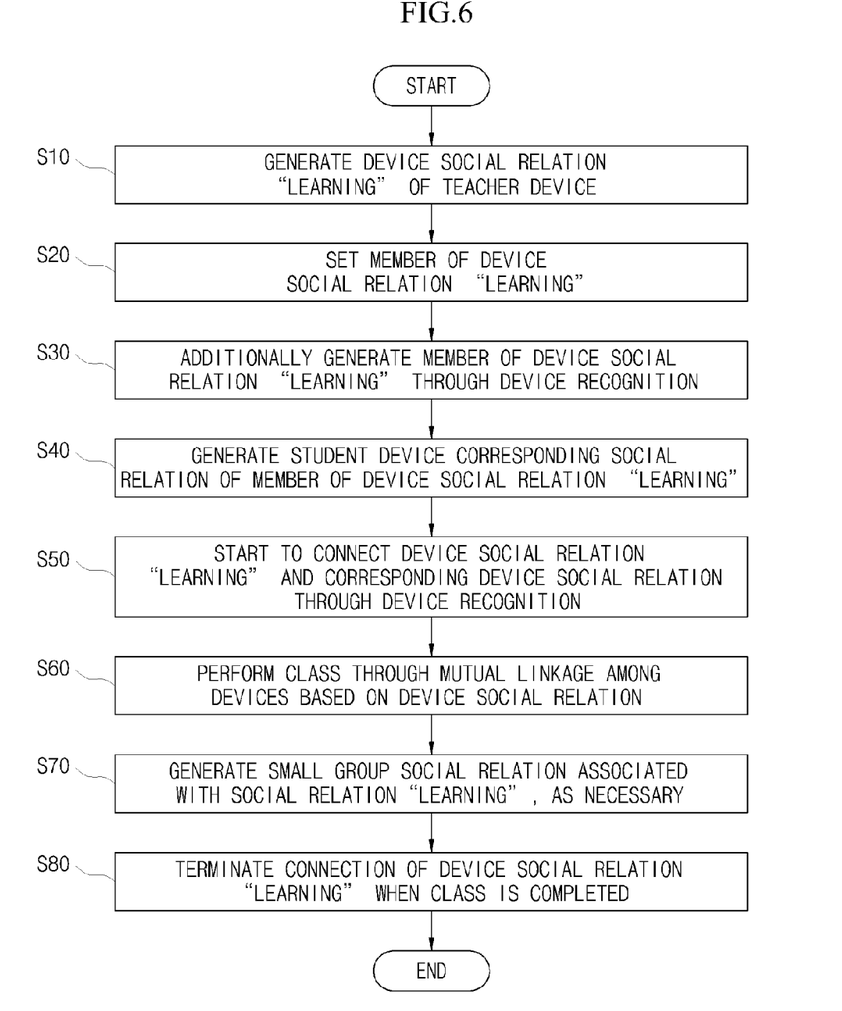
FIG. 6 is a flowchart illustrating a smart learning process based on a device social relation according to an embodiment of the present invention.

FIG. 6 is a flowchart illustrating a smart learning process based on a device social relation according to an embodiment of the present invention.

A smart learning method according to another embodiment of the present invention includes generating a device social relation, setting a member device included in the device social relation, and transmitting learning content to the member device included in the device social relation.

Referring to FIG. 6, the smart learning process based on the device social relation will be described in more detail.

First, in operation S10, a teacher device (first device) generates a device social relation "learning". In this instance, the teacher device (first device) designates a name and basic properties of the device social relation.

In operation S20, the teacher device (first device) sets a member of the device social relation "learning". The member of the device social relation may be designated in advance by the teacher device (first device) or designated during class.

For example, in a case of a general class of the elementary school, separated classes are determined, and therefore designation in advance may be possible. However, when a student participates in the corresponding class while having another device rather than the designated device, a new device should be included as the member of the device social relation.

In this instance, the new device may be included as the member of the device social relation in a method which will be described later.

In operation S30, the member of the device social relation "learning" may be additionally set through device recognition of the teacher device (first device).

In addition, when the new device is recognized by the device recognition module 320, the new device may be included in the device social relation through a user interface of the teacher device (first device).

Device recognition may be performed through a sensor module 40 mounted in the teacher device (first device) or the device recognition module 320.

When the new device is included in the device social relation, the user interface may include a graphic user interface (GUI) as shown in FIG. 7.

In FIG. 7, an example in which, when the device recognized by the device recognition module 320 is displayed, a user groups the displayed devices through a mouse, a touch pad, a screen, or the like to display the recognized device as the member of the device social relation is illustrated.

In this instance, adjacent devices may be disposed close to each other on a display based on distance information from the device recognition module 320 to the device.

In addition, the adjacent devices may be disposed close to each other on the display using another device social relation (for example, the same experiment group, or the like). That is, the devices of the members included in the device social relation may be disposed close to each other on the display.

In addition, when a new device is included in the device social relation, the teacher device (first device) may recognize a student who raises his or her hand to lift the device high through linkage with the sensor module 40 as illustrated in FIG. 8, and enable the new device to be included in the device social relation.

In addition, as illustrated in FIG. 9, by detecting the movement of the teacher device through the sensor module 40, the new device may be included in the device social relation.

In addition, in a case of a device having NFC mounted therein as illustrated in FIG. 10, the new device may be included in the device social relation through NFC contact.

When the teacher device (first device) additionally sets the member of the device social relation "learning" through device recognition in operation S30, the corresponding social relation is generated in the student device (second device) that is the member of the device social relation "learning" in operation S40.

Next, in operation S50, connection of the device social relation "learning" and the corresponding device social relation is started through device recognition.

Specifically, when the member device is determined, the device social relation corresponding to the device social relation "learning" is generated in the student device. Next, resources of the student device are provided to the teacher device through connection between devices.

When the device social relation is generated in the device sociality linkage module 330, resources to be shared is defined in the device social relation, and therefore the user interface processing module 310 provides an appropriate user interface to each class.

The user interface may control in such a manner that actual sharing is generated even though the resources of the device are shared by the device social relation.

In operation S60, when the configuration of the device social relation is completed, the corresponding class may be conducted through mutual connection among devices based on the completed configuration of the device social relation.

The class may be mainly conducted by the user interface of the teacher device (first device). When the device social relation is newly needed during the class, the device social relation may be newly generated in the above-described method.

When the new device social relation is needed, a user may register and use a lower device social relation of the device social relation "learning" in operation S70.

Figure 11:
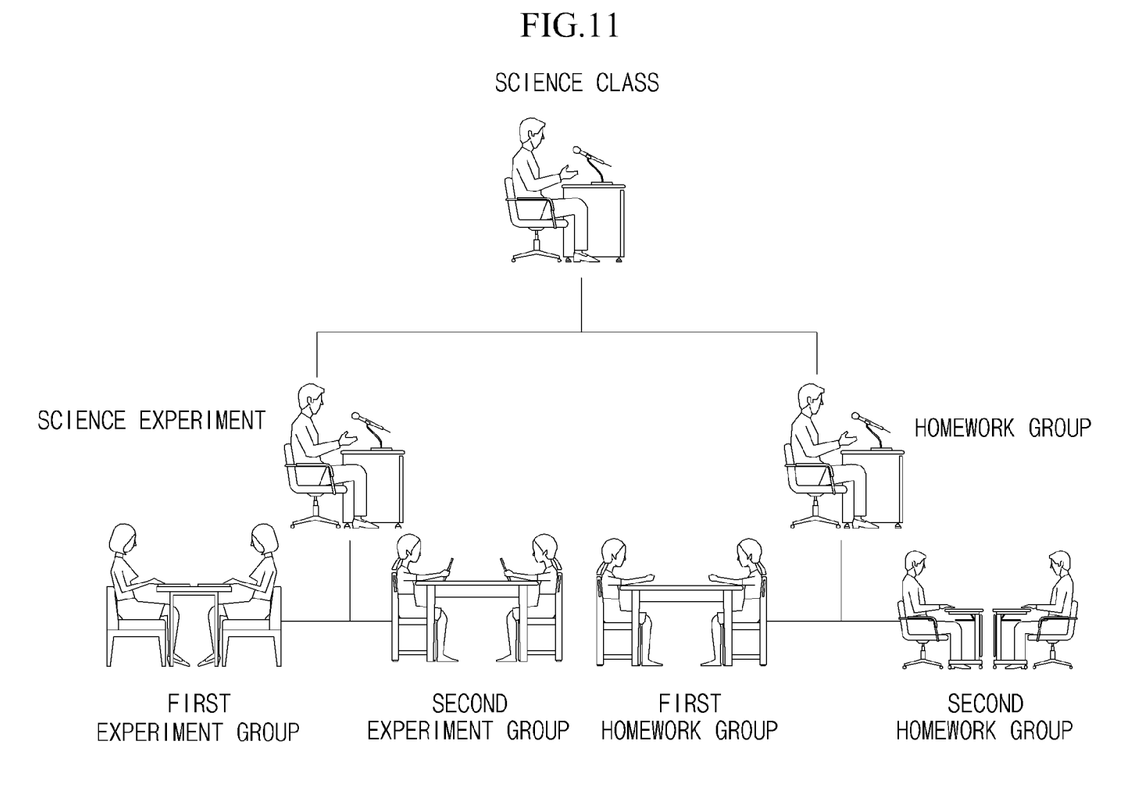
FIG. 11 is a diagram illustrating an example of a hierarchical device social relation structure according to an embodiment of the present invention.

FIG. 11 is a diagram illustrating an example of a hierarchical device social relation structure according to an embodiment of the present invention.

As illustrated in FIG. 11, when "science class" is a device social relation set through the first device, "science experiment", "homework group", and the like may be set as lower device social relations. In addition, the lower device social relation "science experiment" may be set as "first experiment group" and "second experiment group", and the device social relation "homework group" may be set as "first homework group", "second homework group", and the like.

As described above, according to the embodiments of the present invention, functions capable of designating the role of the device in smart learning and generating the social relation may be provided, and mutual linkage among devices may be more facilitated according to the generated social relation, thereby implementing efficient smart learning.

In addition, through the smart learning utilizing the device social relation, more convenient mutual linkage of various terminals may be supported.

In addition, learning in various spaces rather than a fixed space may be possible, thereby increasing efficiency of the learning.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A smart learning system comprising:
  a first device that generates a device social relation based on a social relationship of users using a plurality of devices including the first device, and shares learning content with the plurality of devices; and at least one second device that executes an event related to the learning content by acquiring the shared learning content based on being included in the device social relation, wherein the smart learning system includes a remote management server that shares information, including the shared learning content, transmitted from the first device to the second device;

wherein at least one of the first device and the second device includes a sensor for detecting motion, and wherein the at least one second device is included in the device social relation based on the first device and the second device being within a sensing range of the sensor relative to each other, and the sensor detecting a predetermined motion of the other of the first device and the second device.

2. The smart learning system of claim 1, wherein the first device is included in the device social relation by sensing information including network signals of the first device, or by a user's input via a user interface.

3. The smart learning system of claim 1, wherein, when the sensor detects the predetermined motion, an icon corresponding to the second device is displayed in a user interface of the first device, and the second device is included in the device social relation based on a user of the first device providing an input to the first device based on the icon corresponding to the second device being displayed in the user interface of the first device.

4. The smart learning system of claim 1, wherein, when the at least one second device is included in the device social relation, the first device generates a lower group social relation associated with the device social relation.

5. The smart learning system of claim 1, wherein the first device and each of the at least one second device include
a user interface processing module that receives social relation generation data including a name of the device social relation, social relation member information, and a social relation member structure from the user,
a device sociality linkage module that generates, stores, updates, corrects, and deletes the social relation based on the social relation generation data,
a device recognition module that recognizes the device using information sensed by a network or the first device and the second device, and
a device function connection module that connects the recognized device and the device included in a predetermined social relation to communicate with each other.

6. The smart learning system of claim 5, wherein the device sociality linkage module generates a data structure of sociality data including the name of the device social relation, social relation member information, a communication ID of the social relation member device, information about resources shared in the social relation, a member structure, and information about roles performed by the first and second devices.

7. The smart learning system of claim 6, wherein the sociality data and the data structure of the sociality data are stored in a storage module inside the device or in the remote management server.

8. The smart learning system of claim 6, wherein the first device included in the device social relation is set based on the data structure of the sociality data.

9. The smart learning system of claim 5, wherein the device recognition module recognizes the device based on positional information of the device and distance information between the devices.

10. The smart learning system of claim 5, wherein the first device further includes
a learning content management module that manages learning content stored in a storage space of a local device or a remote server, designates learning content required in the device social relation, and shares the designated learning content with the second device.

11. The smart learning system of claim 6, wherein the first device and each of the at least one second device further include
a server interface module that manages the first device, metadata of the first device, and device sociality data, and communicates with the remote management server.

12. The smart learning system of claim 5, wherein the first device and each of the at least one second device further include
a device function management module that manages corrected or updated device sociality data.

13. A smart learning method comprising:
generating a device social relation among a plurality of devices based on a social relationship of users of the plurality of devices;
setting a first device as being included in the device social relation;
recognizing a second device by the first device;
setting the second device as being included in the device social relation, based on the second device being recognized by the first device; and
transmitting learning content to the second device after setting the second device as being included in the device social relation,
wherein one of the first device and the second device includes a sensor, and
recognizing the second device by the first device includes moving one of the first device and second device with a predetermined motion, and detecting the predetermined motion by the sensor of the other of the first device and the second device.

14. The smart learning method of claim 13, wherein the setting of the second device as being included in the device social relation includes
setting the second device as being included in the device social relation based on sensing information including network signals of the second device, and
setting the second device as being included in the device social network in response to an input of a user of one of the first device and the second device.

15. The smart learning method of claim 13, wherein the setting of the second device as being included in the device social relation includes
displaying the second device in a user interface of the first device after recognizing the second device, and
setting the second device as being included in the device social network based on an input by a user of the first device.

16. The smart learning method of claim 15, wherein the recognizing of the second device includes
recognizing the device further using at least one of signal strength of a network of the device, broadcasting in a segment of the network, and multitasking in the segment of the network.

17. The smart learning method of claim 13, wherein the generating of the device social relation includes generating a data structure of sociality data including a name of the device social relation, social relation member information, a communication ID of the social relation member device, information about resources shared in the social relation, a member structure, and information about a role performed by the device, and storing the generated data structure of sociality data and the sociality data.

18. The smart learning method of claim 17, wherein the member device included in the device social relation is set based on the data structure of sociality data.

* * * * *